US010060649B2

(12) United States Patent
Kim et al.

(10) Patent No.: US 10,060,649 B2
(45) Date of Patent: Aug. 28, 2018

(54) HYBRID HEATER FOR VEHICLE

(71) Applicants: Hyundai Motor Company, Seoul (KR); Kia Motors Corp., Seoul (KR)

(72) Inventors: Myung Hoe Kim, Seoul (KR); In Gyu Kim, Hwaseong-si (KR); Jong Chul Kim, Cheonan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 927 days.

(21) Appl. No.: 14/532,830

(22) Filed: Nov. 4, 2014

(65) Prior Publication Data

US 2015/0369515 A1 Dec. 24, 2015

(30) Foreign Application Priority Data

Jun. 19, 2014 (KR) ........................ 10-2014-0075161

(51) Int. Cl.

| | |
|---|---|
| ***B60H 1/22*** | (2006.01) |
| ***F24H 3/04*** | (2006.01) |
| ***F24H 3/12*** | (2006.01) |
| ***F24H 9/18*** | (2006.01) |
| ***H05B 3/24*** | (2006.01) |

(52) U.S. Cl.

CPC ......... *F24H 3/0429* (2013.01); *F24H 3/0435* (2013.01); *F24H 3/12* (2013.01); *F24H 9/1872* (2013.01); *H05B 3/24* (2013.01); *F24D 2200/08* (2013.01); *F24H 2250/04* (2013.01); *H05B 2203/02* (2013.01); *H05B 2203/023* (2013.01)

(58) Field of Classification Search

CPC .... F24H 3/0429; F24H 9/1872; B60H 1/2225
USPC .......................... 392/485, 486; 219/202, 481
See application file for complete search history.

(56) References Cited

U.S. PATENT DOCUMENTS

| | | | | |
|---|---|---|---|---|
| 5,995,711 A * | 11/1999 | Fukuoka ............ | B60H 1/00328 219/202 |
| 6,055,360 A * | 4/2000 | Inoue ................. | B60H 1/00321 165/151 |
| 6,178,292 B1 * | 1/2001 | Fukuoka ................. | F24H 1/009 165/175 |
| 6,265,692 B1 * | 7/2001 | Umebayahi ........ | B60H 1/00064 165/299 |
| 7,064,301 B2 * | 6/2006 | Han ...................... | F24H 3/0405 219/202 |
| 7,361,868 B2 * | 4/2008 | Otto ..................... | B60H 1/2225 219/202 |

(Continued)

FOREIGN PATENT DOCUMENTS

| | | |
|---|---|---|
| JP | 2010-025527 A | 2/2010 |
| JP | 2011-218908 A | 11/2011 |

(Continued)

*Primary Examiner* — Dana Ross
*Assistant Examiner* — Lawrence Samuels
(74) *Attorney, Agent, or Firm* — Morgan, Lewis & Bockius LLP

(57) ABSTRACT

A hybrid heater includes a heater core portion connected to a cooling water inflow tube and a cooling water outflow tube at one side and having an inside through which cooling water circulates, and a PTC heater portion fastened to a front of the heater core portion, inside of which a plurality of plate-type PTC rods arranged in parallel in a horizontal direction are provided, and provided at one side with a connector that is connected electrically to the plurality of PTC rods.

9 Claims, 4 Drawing Sheets

(56) References Cited

U.S. PATENT DOCUMENTS

| | | | | |
|---|---|---|---|---|
| 8,759,718 | B2 * | 6/2014 | Clade | B60H 1/2225 219/200 |
| 9,278,606 | B2 * | 3/2016 | Gu | B60H 1/2225 |
| 9,333,835 | B2 * | 5/2016 | Gu | B60H 1/034 |
| 2005/0205552 | A1 * | 9/2005 | Han | F24H 3/0405 219/540 |
| 2007/0045263 | A1 * | 3/2007 | Otto | B60H 1/2225 219/203 |
| 2009/0314764 | A1 * | 12/2009 | Mori | F24H 3/0405 219/520 |
| 2013/0230302 | A1 * | 9/2013 | Kominami | F24H 9/20 392/307 |
| 2013/0306622 | A1 * | 11/2013 | Gu | B60H 1/2225 219/534 |
| 2014/0008450 | A1 * | 1/2014 | Gu | B60H 1/034 237/12.3 R |

FOREIGN PATENT DOCUMENTS

| | | | |
|---|---|---|---|
| KR | 10-2005-0103316 | A | 10/2005 |
| KR | 10-0633128 | B1 | 9/2006 |
| KR | 10-2011-0134621 | A | 12/2011 |
| KR | 10-2012-0140349 | A | 12/2012 |
| KR | 10-2013-0073042 | A | 7/2013 |

* cited by examiner

HYBRID HEATER FOR VEHICLE

CROSS-REFERENCE TO RELATED APPLICATION

The present application claims priority to Korean Patent Application No. 10-2014-0075161, filed Jun. 19, 2014, the entire contents of which is incorporated herein for all purposes by this reference.

BACKGROUND OF THE INVENTION

Field of the Invention

The present invention relates to a hybrid heater for a vehicle, in which a heater core and a Positive Temperature Coefficient (PTC) heater are implemented integrally.

Description of Related Art

Generally, a heating device is used for increasing the outside temperature and various devices using different methods have been proposed and used in various ways.

In particular, a heating device for serving to heat an interior of a vehicle among the heating devices provided inside an engine room of a vehicle is configured such that the heat exchange media for lowering the temperature of the engine heats the interior of a vehicle by heating external air while it circulates through a heater core.

However, in the case of a diesel engine vehicle, its heat exchange efficiency is high and thus it requires a long time until the heat exchange media for cooling an engine is heated when a vehicle starts-on initially, compared to a gasoline engine. Accordingly, the heating of the heating exchange media is delayed in winter season thereby to decrease the initial interior heating performance, and for solving this problem a Positive Temperature Coefficient (PTC) heater is applied together with the heater core.

A PTC heater operates for a short time when the cooling water is not heated in winter season, the initial starting-on time, and the heater for a vehicle is not heated, in order to heat the interior of a vehicle, thereby increasing temperature of air inflowing to the PTC heater and supplementing heating performance of a vehicle.

However, generally the PTC heater and the heater core are provided separately, and thus consume the interior space of an air conditioning device to become cause for deteriorating space efficiency.

Further, with respect to applying the PTC heater it needs a technology that it is provided separately and fastened easily to be integrated with the heater core under the current situation. That is, it needs a technology that implements integrally the PTC heater and the heater core by fastening easily and dually the PTC heater to the heater core without changing the design of the existing heater core so as to apply to various kinds of vehicles.

According to the present invention, the PTC heater and the heater core are connected integrally not to deteriorate space efficiency and more particularly, the heater core and the PTC heater are provided to operate and perform heating while the temperature of an engine is low and thus a heater of a vehicle is not heated, wherein the heater core and the PTC heater are integrated and configured efficiently to improve space efficiency of the interior of a vehicle, compared to a related art in which the heater core and the PTC heater are formed separately to greatly deteriorate the space efficiency of an air conditioning device case.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid heater, in which a PTC heater is installed in a heater core to increase the space efficiency of an air conditioning device and more particularly, the heater core and the PTC heater are efficiently arranged to improve the space efficiency and the uniformity of temperature distribution by optimizing the structure.

According to various aspects of the present invention a hybrid heater may include a heater core portion connected to a cooling water inflow tube and a cooling water outflow tube at one side and having an inside through which cooling water circulates, and a PTC heater portion fastened to the front of the heater core portion, inside of which a plurality of plate-type PTC rods arranged in parallel in a horizontal direction are provided, and provided at one side with a connector that is connected electrically to the plurality of PTC rods.

Header tanks may be provided on upper and lower ends of the heater core portion, respectively, both the header tanks may be connected through cooling water tubes arranged in parallel in a vertical direction and the PTC rods and the cooling water tubes may be arranged to cross at right angles.

A plurality of plate-type pins that crosses at a right angle to the PTC rods may be provided in parallel at each PTC rod.

Bending portions may be formed on both ends of the plate-type pin, respectively, and each bending portion of the plate-type pin may be in close contact with an end of an adjacent plate-type pin.

Each PCT rod may be arranged in a horizontal direction, each plate-type pin may be arranged in a vertical direction, the bending portions may be formed on upper and lower ends of each plate-type pin, one bending portion of each plate-type pin may be in close contact with an upper end or a lower end of an adjacent plate-type pin, and a space for wind passing through may be formed between adjacent plate-type pins.

A through-hole may be formed at a center of each plate-type pin and the plurality of plate-type pins may be fitted into the PTC rods in sequence through each through-hole to be assembled.

A sectional area of one end of each PTC rod may be greater than a sectional area of the through-hole of each plate-type pin and a sectional area of another end of each PTC rod may be smaller than the sectional area of the through-hole of each plate-type pin.

The beads may be formed to be protruded at one side of each plate-type pin.

A lateral length of the PTC rod in a horizontal direction may be longer than a vertical length thereof in a vertical direction at a cross section cut in a wind flow direction.

Fastening portions may be provided on upper and lower ends of one side of the PTC heater portion, respectively, and one end of each of the fastening portions may be formed in a hook shape to be protruded onto the one side of the heater core portion at a rear side and coupled to the inflow tube and the outflow tube that are connected to upper and lower ends of the heater core portion in a shape of surrounding the inflow tube and the outflow tube, respectively, when pressurized.

A first connection portion may be formed on another end of each fastening portion, a second connection portion may be formed on the upper and lower ends of the one side of the PTC heater portion, and each fastening portion and PTC heater portion may be detached through the first connection portion and the second connection portion.

The PTC rod may consist of a plate-shape PTC element that heats by receiving electricity and a protection bar that is made of heat conductive material and surrounds and protects the PTC element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As used herein, the singular forms "a," an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
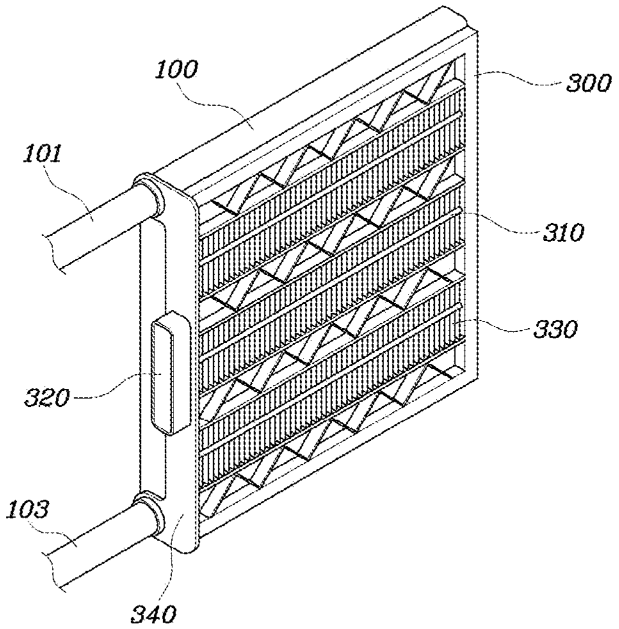
FIG. 1 is a perspective view illustrating an exemplary hybrid heater according to the present invention.
Figure 2:
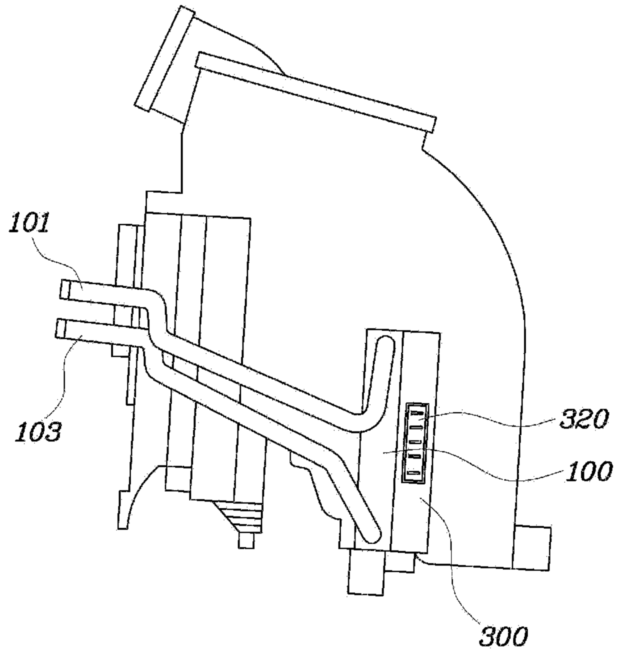
FIG. 2 is a perspective view illustrating the exemplary hybrid heater according to the present invention, which is installed in Heating, Ventilation and Air Conditioning (HVAC) housing.
Figure 3:
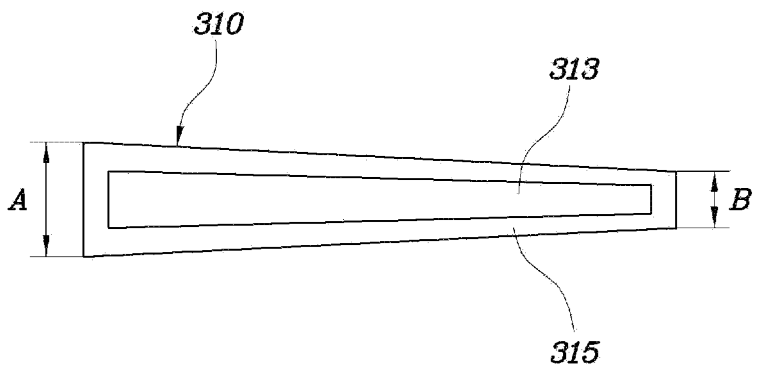
FIG. 3 is a view illustrating simply a PTC rod in the exemplary hybrid heater according to the present invention.
Figure 4:
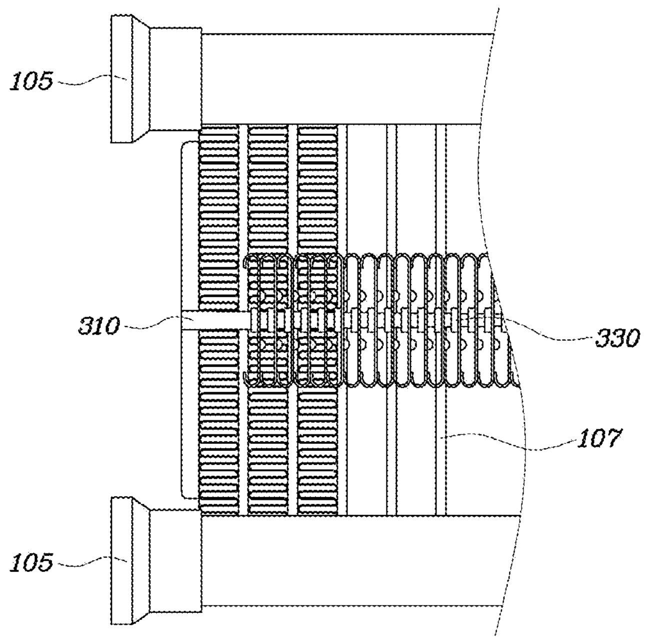
FIG. 4 is a view illustrating an arrangement of a heater core and a PTC heater in the exemplary hybrid heater according to the present invention.
Figure 5:
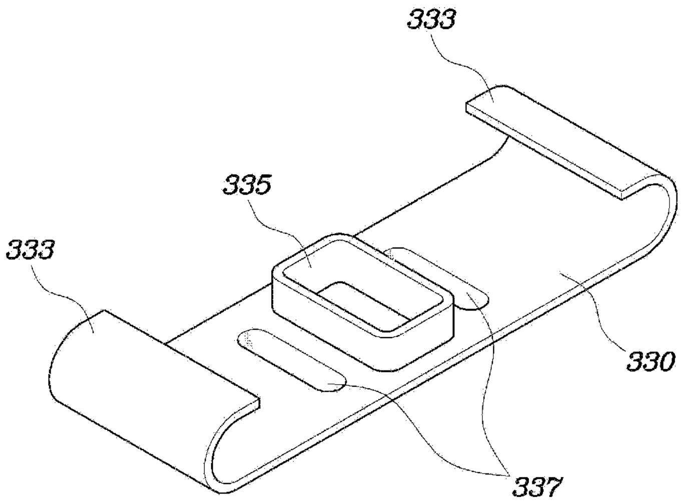
FIG. 5 a view illustrating a plate-type pin in the exemplary hybrid heater according to the present invention.
Figure 6:
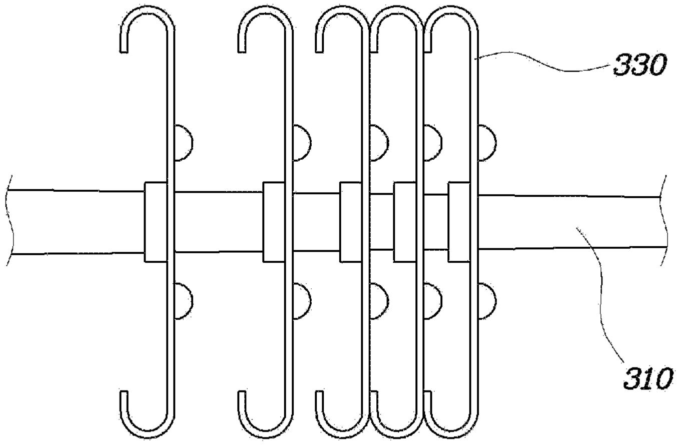
FIG. 6 is a view illustrating a connection of a PTC rod and a plate-type pin in the exemplary hybrid heater according to the present invention.
Figure 7:
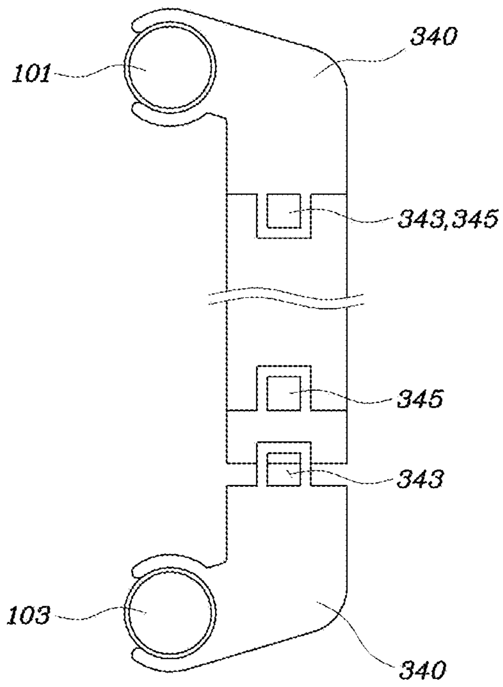
FIG. 7 is a view illustrating a fastening portion in the exemplary hybrid heater according to the present invention.

FIG. 1 is a perspective view illustrating a hybrid heater, FIG. 2 is a perspective view illustrating the hybrid heater, which is installed in HVAC housing, FIG. 3 is a view illustrating simply a PTC rod, FIG. 4 is a view illustrating an arrangement of a heater core and a PTC heater, FIG. 5 is a view illustrating a plate-type pin, FIG. 6 is a view illustrating a connection of a PTC rod and a plate-type pin, and FIG. 7 is a view illustrating a fastening portion, according to various embodiments of the present invention.

Referring to FIGS. 1 to 7, a hybrid heater according to various embodiments of the present invention may include a heater core portion 100 to a side of which a cooling water inflow tube 101 and a cooling water outflow tube 103 are connected and through the inside of which cooling water circulates, and a PTC heater portion 300 which is fastened to the front of the heater core portion 100, inside of which a plurality of plate-type PTC rods 310 that are arranged in parallel in a horizontal direction are provided, and to one side of which a connector 320 that is connected electrically to the plurality of the PTC rods 310 is provided.

The hybrid heater of the present invention features that the heater core portion 100 and the PTC heater portion 300 provided inside the air conditioning device are fastened integrally. At this time, it is important to set a layout of the heater core portion 100 and the PTC heater portion 300 inside the air conditioning device so as to increase space efficiency.

Accordingly, as shown in FIG. 4, header tanks 105 are provided on upper and lower ends of the heater core portion 100, respectively, and the both header tanks 105 are connected through cooling water tubes 107 that are arranged in parallel in a vertical direction and thus the PTC rods 310 and the cooling water tubes 107 are arranged to cross at a right angle.

In more detailed description, when the cooling water tubes 107 and the PTC rods 310 are arranged to cross at a right angle, the cooling water inflow tube 101 and the cooling water outflow tube 103 are provided on one side of the heater core portion 100, and the connector 320 is provided on the same one side of the PTC heater portion 300 as the heater core portion, a maximum space efficiency can be obtained when the heater core portion 100 and the PTC heater portion 300 are connected. This is because the line for supplying electricity to the PTC rod 310 is provided to one side of the air conditioning device and thus it can be connected to the connector 320 without deploying an unnecessary line when the layout of the PTC heater portion 300 is formed as described above, thereby increasing space efficiency of the inside of an air conditioning device.

Here, the area of the PTC heater portion 300 is featured as the same as a front surface area of the heater core portion 100. In a more detailed description, a plurality of PTC rods 310 is arranged at the PTC heater portion 300 in parallel in a horizontal direction, wherein they are arranged alternatively with the outer cases of the PTC heater portion 300 so that the area of the PTC heater portion 300 becomes the same as the front surface area of the heater core portion 100 while the number of components of the PTC rod 310 is reduced. As a result, the air supplied for heating passes through the heating core portion 100 inside the air conditioning device and then passes through the PTC heater portion 300 having the same area as the front surface area of the heater core portion, and thus the temperatures of the PTC rod 310 and the plate-type pin 330 are set uniformly. The plate-type pin 330 will be described later.

The PTC rod 310 is featured consisting of a plate-shape PTC element 313 that heats by receiving electricity and a protection bar 315 that is made of heat conductive material and surrounds and protects the PTC element.

The PTC element 313 is protected by the protection bar 315 made of heat conductive material thereby to reduce the impact to be applied to the PTC element 313. However, the protection bar 315 may be removed in order to save costs and only the PTC element 313 may be used in the present invention.

Meanwhile, a plurality of plate-type pins 330 that crosses at a right angle to the PTC rod 310 is provided in parallel at each PTC rod 310. Here, the plate-type pin 330 is made of heat conductive material and is used for widening the area for transferring heat by the PTC rod 310.

As described above, as shown in FIG. 4, a plurality of cooling water tubes 107 that are connected between the header tanks 105 and the PTC rod 310 is arranged to cross at a right angle and the plate-type pin 330 is fitted into the PTC rod to cross at a right angle.

At this time, bending portions 333 are formed on both ends of the plate-type pin 330, respectively and each bending portion 333 of the plate-type pin 330 is in close contact with an end of an adjacent plate-type pin 330.

Further, each PTC rod 310 is arranged in a horizontal direction, the plate-type pin 330 is arranged in a vertical direction, the bending portions 333 are formed on upper and lower ends of the plate-type pin 330, respectively, a bending portion 333 of the plate-type pin 330 is in close contact with an upper end or a lower end of the adjacent plate-type pin 330, and a space for wind passing through is formed between adjacent plate-type pins 330.

Further, a through-hole 335 is formed at a center of the plate-type pin 330 and a plurality of plate-type pins 330 are fitted into the PTC rods in sequence through the through-hole 335 to be assembled.

Additionally, it is featured that beads 337 are formed to be protruded at one side of the plate-type pin 330.

As shown in FIG. 5, the bending portion 333 and the beads 337 are formed on the plate-type pin 330 so that heat conductive area is increased to improve heat transfer efficiency. Further, the through-hole 335 is formed at a center of the plate-type pin 330.

Furthermore, the plate-type pin 330 is arranged naturally at a predetermined pitch interval by the bending portion 333.

Further, as shown in FIG. 3 or FIG. 6, a sectional area of one end of the PTC rod 310 is greater than that of the through-hole 335 of the plate-type pin 330, and a sectional area of the other end thereof is smaller than that of the through-hole 335 of the plate-type pin 330.

As a result, when the plate-type pin 330 is fitted into the PTC rod 310, the through-hole 335 of the plate-type pin 330 is fixed with a sectional area of the PTC rod 310, which is widened gradually, so that the plate-type pin 330 and the PTC rod 310 can be connected without a separate fastening device.

Further, the space for wind passing through is formed as the plurality of plate-type pins 330 are connected to the PTC rod 310 to be in close contact, and here a lateral length of the PTC rod 310 in a horizontal direction may be longer than a vertical length thereof in a vertical direction at a cross section cut in a wind flow direction.

In more detailed description, when wind flows to a rear surface of the PTC rod 310 through the heater core portion 100, the PTC rod 310 is formed as described above and thus air loss due to the vertical length in a vertical direction is minimized and the lateral length in a horizontal direction is lengthened to increase heat transfer area, thereby improving heating efficiency of a hybrid heater.

Meanwhile, according to the present invention it is featured that fastening portions 340 are provided on an upper and lower ends on one side of the PTC heater portion 300, respectively, wherein one end of the fastening portion 340 is formed as a hook that is protruded toward the heater core portion at a rear side of the hybrid heater and thus when the fastening portions 340 are compressed, they are connected to the inflow tube 101 and the outflow tube 103 that are connected to an upper and lower ends of the heater core portion 100 as the shapes to surround the inflow tube 101 and the outflow tube 103. Further, a first connection portion 343 is connected to the other end of the fastening portion 340, a second connection portion 345 is formed on each of an upper and lower ends at one side of the PTC heater portion, and the fastening portion 340 and the PTC heater portion 300 are attached/detached through the first connection portion 343 and the second connection portion 345.

Referring to FIG. 7, it is shown that the fastening portion 340 at an upper end is connected to the PTC heater portion 300 through the first connection portion 343 and the second connection portion 345 while the fastening portion 340 is connected to the inflow tube 101 a hook shape of which surrounds the inflow tube 101. On the contrary, in a case of the fastening portion at a lower end, it is shown that the first connection portion 343 and the second connection portion 345 are separated and thus the fastening portion 340 is separated from the PTC heater portion 300 while the fastening portion 340 is connected to the outflow tube 103 a hook shape of which surrounds the outflow tube 103. Here, the hook shape of the fastening portion 340 may be separated from the inflow tube 101 or the outflow tube 103.

By providing the fastening portion 340 configured as described above, when one of the heater portion 100 and the fastening portion 340 is failed and needs to be repaired, they are to be separated individually and repaired, thereby improving A/S performance. For example, when the heater core portion 100 is failed, the hook shape of the fastening portion 340 is disconnected from the inflow tube 101 and the outflow tube 103 to separate only the heater core portion 100. On the contrary, when the PTC heater 300 is failed, the fastening portion 340 is disconnected from the first connection portion 343 and the second connection portion 345 to separate only the PTC heater 300.

At this time, the first connection portion 343 may be formed as an insertion hole or a protrusion, and the second connection portion 345 may be formed as an insertion hole or a protrusion corresponding to the first connection portion 343.

According to the hybrid heater configured as described above, the heater core and the PTC heater are developed as an integration type, thereby increasing space efficiency.

Specially, the heater core and the PTC heater are arranged efficiently thereby to improve greatly space efficiency.

Further, the PTC heater and the heater core are integrated thereby to save cost and lower weight.

Further, the configuration of the PTC heater is optimized to improve temperature distribution property and heating efficiency, thereby improving fuel efficiency.

Additionally, the PTC heater having a high efficiency can be applied easily without changing the design of the conventional heater core or HVAC housing and the assembly property can be ensured easily.

For convenience in explanation and accurate definition in the appended claims, the terms “upper”, “lower”, “inner” and “outer” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid heater, comprising:

a heater core portion connected to a cooling water inflow tube and a cooling water outflow tube at one side and having an inside through which cooling water circulates;

a Positive Temperature Coefficient (PTC) heater portion fastened to a front of the heater core portion, inside of which a plurality of plate-type PTC rods arranged in parallel in a horizontal direction are provided, and provided at one side with a connector that is connected electrically to the plurality of plate-type PTC rods; and a plurality of plate-type pins made of heat conductive material, wherein the plurality of plate-type pins is arranged in parallel at each of the plurality of plate-type PTC rods by crossing at a right angle to the plurality of plate-type PTC rods, wherein a through-hole is formed at a center of each of the plate-type pins and the plurality of plate-type pins are fitted into the each of the plurality of plate-type PTC rods in sequence along a longitudinal direction of the each of the plurality of plate-type PTC rods through the through-hole to be assembled, and wherein the each of the plurality of plate-type PTC rods is tapered in a longitudinal direction thereof such that a sectional area of a first end of the each of the plurality of plate-type PTC rods is greater than a sectional area of the through-hole of the each of the plurality of plate-type pins, and such that a sectional area of a second end of each of the plurality of PTC rods is smaller than the sectional area of the through-hole of the each of the plurality of plate-type pins.

2. The hybrid heater of claim 1, wherein header tanks are provided on upper and lower ends of the heater core portion, respectively, a first header tank and a second header tank of the header tanks are connected through cooling water tubes arranged in parallel in a vertical direction and the plate-type PTC rods and the cooling water tubes are arranged to cross at right angles.

3. The hybrid heater of claim 1, wherein bending portions are formed on first and second ends of the each of the plate-type pins, respectively, and each bending portion of the each of the plate-type pins is in close contact with an end of an adjacent plate-type pin.

4. The hybrid heater of claim 1, wherein the each of the plate-type PCT rods is arranged in a horizontal direction, the each of the plate-type pins is arranged in a vertical direction, the bending portions are formed on upper and lower ends of the each of the plate-type pins, one bending portion of the each of the plate-type pins is in close contact with an upper end or a lower end of an adjacent plate-type pin, and a space for wind passing through is formed between adjacent plate-type pins.

5. The hybrid heater of claim 1, wherein beads are formed to be protruded at one side of the each of the plate-type pins.

6. The hybrid heater of claim 1, wherein a lateral length of the plate-type PTC rods in a horizontal direction is longer than a vertical length thereof in a vertical direction at a cross section cut in a wind flow direction.

7. The hybrid heater of claim 1, wherein fastening portions are provided on upper and lower ends of one side of the PTC heater portion, respectively, and a first end of each of the fastening portions is formed in a hook shape to be protruded onto the one side of the heater core portion at a rear side and coupled to the inflow tube and the outflow tube that are connected to upper and lower ends of the heater core portion in a shape of surrounding the inflow tube and the outflow tube, respectively, when pressurized.

8. The hybrid heater of claim 7, wherein a first connection portion is formed on a second end of each of the fastening portions, a second connection portion is formed on the upper and lower ends of the one side of the PTC heater portion, and the each of the fastening portions and the PTC heater portion are detached through the first connection portion and the second connection portion.

9. The hybrid heater of claim 1, wherein the each of the PTC rods consists of a plate-shape PTC element that heats by receiving electricity and a protection bar that is made of heat conductive material and surrounds and protects the PTC element.

* * * * *